United States Patent [19]

Sifferman et al.

[11] 4,105,618

[45] Aug. 8, 1978

[54] CONTROL OF INCOMPETENT FORMATIONS WITH THICKENED COMPOSITIONS CONTAINING BASE-SETTABLE RESIN

[75] Inventors: Thomas R. Sifferman; Derry D. Sparlin, both of Ponca City, Okla.

[73] Assignee: Continental Oil Company, Ponca City, Okla.

[21] Appl. No.: 827,488

[22] Filed: Aug. 25, 1977

Related U.S. Application Data

[62] Division of Ser. No. 760,251, Jan. 17, 1977.

[51] Int. Cl.$^2$ .............................................. E21B 33/138
[52] U.S. Cl. ........................... 260/33.6 UA; 166/295; 260/29.1 SB; 260/33.4 EP; 260/33.4 R; 260/33.6 EP
[58] Field of Search ................ 166/295; 260/33.4 EP, 260/33.4 R, 33.6 EP, 33.6 UA, 29.1 SB

[56] References Cited

U.S. PATENT DOCUMENTS

| 3,236,795 | 2/1966 | Graver | 260/33.4 EP |
|---|---|---|---|
| 3,285,339 | 11/1966 | Walther et al. | 166/295 |
| 3,389,751 | 6/1968 | Harnsberger | 166/295 |
| 3,391,738 | 7/1968 | Sparlin | 166/295 |
| 3,404,735 | 10/1968 | Young et al. | 166/295 |
| 3,476,189 | 11/1969 | Bezemer et al. | 166/295 |
| 3,692,116 | 9/1972 | Sparlin | 166/295 |
| 3,760,880 | 9/1973 | Dollarhide | 166/295 |
| 3,776,311 | 12/1973 | Carnes et al. | 166/295 |
| 3,857,444 | 12/1974 | Copeland | 166/295 |
| 3,933,204 | 1/1976 | Knapp | 166/295 |

*Primary Examiner*—Ronald W. Griffin
*Attorney, Agent, or Firm*—A. Joe Reinert

[57] ABSTRACT

Sand control in an incompetent formation is effected by squeezing a thickened composition [comprising a hydrocarbon oil carrier, particulate matter (e.g. sand) a base-settable thermosetting resin, a neutralizing agent (e.g. lauryl amine), a miscible polar solvent (e.g. ethanol), and a carboxy vinyl polymer (e.g. CARBOPOL 934)] in contact with the incompetent formation and curing with a basic catalyst.

9 Claims, No Drawings under 4,105,618

CONTROL OF INCOMPETENT FORMATIONS WITH THICKENED COMPOSITIONS CONTAINING BASE-SETTABLE RESIN

This is a division, of application Ser. No. 760,251, filed Jan. 17, 1977.

BACKGROUND OF THE INVENTION

1. Field of the Invention

This invention relates to control of incompetent subterranean formations penetrated by wellbores.

2. Brief Description of Prior Art

In the production of fluids, such as oil, gas, water, and the like from subterranean formations, a number of difficulties are encountered when the well through which the fluids are produced penetrates an incompetent or unconsolidated subterranean formation. Such formations frequently are composed of incompetent sand, and grains of the sand become entrained in the fluid being produced and are carried into the wellbore. The result of such entrainment, among other things, is often the abrasion of the pumping equipment in the wellbore, clogging of the strainers, sand bridging in tubing, plugging of surface flow lines, filling of oil-water separators and the sanding in of a cavity immediately adjacent to the strainers. These effects, in turn, ultimately cause a sharp decrease in the rate of production of hydrocarbon fluids and increase maintenance costs.

Various solutions to this problem have been proposed. For example, gravel and sand packs employing the injection of particulate solids in thickened hydrocarbons wherein the thickening agent is an aluminum soap of fatty acids, finely-divided silica, bentonite, certain other soaps (NAPALM) and the like have been employed as are disclosed by exemplary patents (U.S. Pat. Nos. 2,906,338, 2,978,024, 3,498,380, and 3,064,730).

One of the more successful solutions to the problem of incompetent formations has been the use of thermosetting polymeric resins for injecting into the wellbore in combination with solid particulate matter to form a consolidated zone adjacent to the wellbore in the sand-producing zone. Such techniques are shown in U.S. Pat. Nos. 3,378,071, patented Apr. 16, 1968, by Derry D. Sparlin and assigned to Continental Oil Company as well as 3,692,116 by Derry D. Sparlin and assigned to Continental Oil Company. U.S. Pat. Nos. 3,378,071 and 3,692,116 are hereby incorporated by reference.

Gelled water systems are presently used for placing the gravel and plastic against subterranean formations for controlling incompetent sand. However, it is desirable in many instances to use a gelled oil system in many formations wherein the oil is more compatible with the subterranean environment than water. Water in some formations impairs the production of fluids from the well by forming emulsions within the oil in the formation, hydrating shales or clays in the formation, and the like. An oil base system prevents these problems and is diluted by the produced crude oil which facilitates the initial production of oil from the well after well treatment.

A further patent relating to a similar process is U.S. Pat. No. 3,391,738, patented July 9, 1968, by Derry D. Sparlin and assigned to Continental Oil Company. U.S. Pat. No. 3,391,738 is hereby incorporated by reference.

In such processes, the mixture injected into the formation to consolidate the portions of the subterranean formations surrounding the wellbore comprises a polymeric resin which polymerizes in situ and, in many instances, contains particulate material. In the use of such processes, it has long been considered desirable that a gelled oil, or the like, be available for suspending the sand and unpolymerized resins during injection into the wellbore. Such a gelled oil wherein a base-settable thermosetting resin is employed has been unavailable to the art heretofore since gelling agents useful to gel light hydrocarbons have been found to be incompatible with the base-settable thermosetting resins injected. As a result, the art has used naturally viscous oils and the like to suspend the particulate matter with the polymeric resins.

The use of viscous oils and the like results in difficulty in removing the viscous oil from the formations once the resins have polymerized. Accordingly, considerable time has been devoted to attempt a development of gelled oil mixtures which are capable of suspending the particulate matter for injection into the wellbore in combination with the polymeric resins without adversely affecting the performance of the resins.

OBJECTS OF THE INVENTION

An object of the invention is to control an incompetent formation.

A further object is to overcome deficiencies in prior art methods of controlling incompetent formations.

A further object is to provide thickened oil based compositions for controlling incompetent formations.

SUMMARY OF THE INVENTION

Such objectives are obtained by positioning into contact with an incompetent subterranean formation a mixture comprising:
(a) a hydrocarbon oil carrier,
(b) a carboxy vinyl polymer,
(c) a particulate material,
(d) a base-settable liquid thermosetting resin,
(e) a catalyst for the resin,
(f) a neutralizing agent for the carboxy vinyl polymer, and
(g) a miscible polar solvent for the carboxy vinyl polymer.

The finely-divided particulate material is present in amount of about 0.25 to 22 pounds of particulate material for each gallon of hydrocarbon oil. The base-settable liquid thermosetting resin is employed in an amount equal to about 0.1 to 5.0 gallons per cubic foot of the particulate material. The mixture can be pressured in contact with the formation. It is cured in contact with the formation. The mixture also preferably contains a coupling agent.

DESCRIPTION OF THE PREFERRED EMBODIMENTS

Some suitable base-settable thermosetting resins for use according to this invention are disclosed in U.S. Pat. No. 3,391,738 incorporated herein by reference, especially in Columns 3 through 7. In particular, the resins disclosed in that patent which are liquid and which solidify upon contacting a basic catalyst are suitable. Use and setting of such resins is well known to the art. Some particularly suitable resins include the epoxy resins which are settable in the presence of a basic composition such as the more basic amines. A commercially available example of a very suitable resin is Shell EPON 828 resin, a Bisphenol A and epichorohydrin alkaline condensation product (average molecular weight of 380). Resole phenolicformaldehyde resins are also suitable and commercially available.

The resin is desirably present in an amount equal to about 0.1 to 5.0 gallons per cubic foot of solid particulate material. Very desirable results are obtained when about 1.0 to about 2.0 gallons per cubic foot of solid particulate matter is employed.

The resin may be added in a diluted form containing about 10 to 90 percent inert or reactive diluent. The amounts of resin stated above refer to 100 percent resin and reactive resin components and do not include the inert diluents.

In the practice of the present invention, about 0.25 to about 22 pounds of solid particulate material per gallon of oil is useful with the more commonly used ranges being about 10 to about 15 pounds of solid particulate material per gallon of oil.

The carboxy vinyl polymer is desirably present in an amount sufficient to result in an apparent viscosity of the composition at surface conditions of at least about 50 cps but not more than about 5000 cps. At least 50 cps viscosity is desirable to maintain particulate matter in suspension, but above about 5000 cps, the composition becomes difficult to handle. The slurry can be heated at the surface to reduce its viscosity so that it can be easily pumped and will have the desired viscosity at the bottom of a hot well. As the slurry is pumped into contact with the subterranean formation, the geothermal temperature increases, causing a reduction in viscosity. Desirably, the composition has a minimum viscosity of at least about 25 cps at bottom-hole conditions in order that the solid particulate material may be adequately suspended in the composition. Such is necessary to ensure that the solid particulate matter, which in many instances is sand, is adequately suspended as it is packed contacting the formation around the wellbore. The concentration of carboxy vinyl polymer required to obtain the desired viscosity will vary with the physical and chemical properties of the oil and the like and thus must be determined for the specific oil used. Such determinations are well within the skill of those skilled in the art. In many instances, concentrations of about 0.03 to about 5.0 weight percent of carboxy vinyl polymer thickener based on the weight of the composition will be found to be most effective.

The viscosity of the oil gelled with the carboxy vinyl polymer thickener may be modified by the addition of the basic catalyst material in combination with time and temperature. Accordingly, those skilled in the art may readily determine the concentration and type of basic catalyst material required to maintain the proper oil viscosity for the time interval necessary to carry the sand and resin slurry into contact with the formation. In some instances, especially where relatively low subterranean temperatures (below about 150° F) exist in the producing interval, additional basic catalyst may be injected to aid in rapid hardening of the thermosetting resin. Oil soluble basic catalyst materials, such as the strong liquid amines and the like may be employed. The slurry of resin, sand, and gelled oil may be intentionally prepared and pumped without basic catalysts or with insufficient basic catalysts to cause the resin to harden, and thereafter an oil-soluble basic catalyst or oil-like basic material may be pumped into the resin-sand mass to catalyze the polymerization of the resin. Also, insofar as the gelled oil mass can generally be broken by contacting with an acidic material, the resin may be thermoset with basic catalysts and then an acidic material in an oil-base may be contacted with the resulting set material to break the gel and aid in subsequent production. Numerous other variations and modifications are possible within the scope of the present invention.

The hydrocarbon oil employed can be any suitable refined or crude oil stream, such as diesel oil, kerosene, light crude, distillates and the like. It is, however, desirable that the oil be substantially neutral.

The finely-divided solid particulate material used, in many instances, will be sand. The sand is normally in a finely-divided form, such as for instance of a U.S. standard mesh size between 10 and 100. Other materials which may be used include nut shells, peach pits, brittle synthetic resins, gilsonite, coke, and similar solid material.

It is often desirable that the mixture which is contacted with the incompetent formation contain a coupling agent. The coupling agent can be any material known to promote adhesion of the organic polymer to mineral matter. In particular, any one or combination of the coupling agents disclosed by U.S. Pat. Nos. 3,285,339, 3,476,189, and 3,339,633 can be employed. A particularly presently preferred commercially available coupling agent is gamma-aminopropyltriethoxysilane. Another quite suitable coupling agent which is commercially available is Dow Corning Z 6040-glycidoxypropyltrimethoxy silane. Further specific examples of some coupling agents include N-aminoethylaminopropyltriethoxy silane, 3,4-epoxycyclohexylethyltrimethyoxy silane, 3-(2-methylpropenoyloxy) propyltrimethoxy silane, 2-propenoxyloxymethyltrimethoxy silane, di [2-(2-propenoyloxy)propyl] dimethoxy silane, 3-(2-propenoyloxy) propyltriethoxy silane, 3-(2-methylpropenoyloxy) propyldimethoxyhydroxy silane, 2-propenoyloxypropyldimethyoxyoxy silane, and the like. Often in the range of about 0.002 to 0.04 parts by weight of coupling agent can be employed for each part by weight of organic polymer. Below about 0.002 parts by weight of coupling agent is largely ineffective while quantities above about 0.04 parts by weight become uneconomic. More preferably, in the range of 0.01 to 0.02 parts by weight of coupling agent are employed for each part by weight of organic polymer to provide optimum effectiveness at an economically feasible cost.

The carboxy vinyl polymer thickeners of this invention are in general the essentially linear polymers of acrylic or methacrylic acid, the cross-linked interpolymers of such acids with a polyunsaturated compound having at least two alkenyl groups, the essentially linear interpolymers of such acids with arcylate and methacrylate esters or interpolymers of mixtures thereof. Such acrylate esters are represented by the structure:

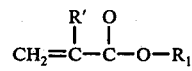

wherein R' is hydrogen or methyl and $R_1$ is an alkyl group having 1 to 8 carbon atoms such as methyl methacrylate, methyl acrylate, ethyl acrylate and methacrylate, the buryl acrylates and methacrylates, and the octyl acrylates and methacrylates, especially the 2-ethylhexyl acrylate and methacrylate. In the interpolymers of acrylic and/or methacrylic acid with the acrylate and methacrylate esters, the amount of the polymerized acid component should be at least 80 mole percent of the copolymer. The foregoing carboxy vinyl polymers and their methods of preparation are well known in the polymer art. The essentially linear carboxy vinyl polymers useful in this invention have average molecular weights in the range of between about 5,000 and 500,000.

Other representative carboxy vinyl polymers are the lightly cross-linked interpolymers of acrylic or methacrylic acid or mixtures of such acids with a polyunsaturated compound having a plurality of terminally unsaturated polymerizable groups and copolymerizable with said acids, for example, copolymers of the acrylic acids with a minor amount, e.g. about 0.5 to about 2.5 percent by weight, preferably 0.75 to 2.0 percent by weight of the polyunsaturated cross-linking monomer, based on the total weight of the copolymer. These cross-linked interpolymers can also contain up to about 20 mole percent of the copolymerized acrylate and methacrylate esters described before. The copolymerization of the monomers ordinarily is carried out in an inert hydrocarbon diluent using a free radical catalyst. The acrylic acid cross-linked copolymers are recovered from their polymerization medium as white powders. They are high molecular weight resins, e.g. generally having an average molecular weight greater than about 200,000, preferably greater than about 2 million and usually in the range of about 3 million.

Typically polyunsaturated compounds which may be copolymerized with acrylic or methacrylic or methacrylic acid in minor amounts to provide the likely cross-linked acrylic acid polymers are the vinyl, allyl and methallyl ethers of polyhydric alcohols having at least four carbon atoms and at least three alcoholic hydroxyl groups. The preferred polyalkenyl polyether monomers are polyallyl sucrose and polyallyl pentaerythritol, desirably containing an average of at least three ally groups attached thereto by means of ether linkages. The preferred polyallyl sucrose (theoretical maximum is 8 allyl groups) and the preferred polyallyl pentaerythritol contains 4 allyl ether groups per molecule (the theoretical maximum). Acrylic acid copolymers employing cross-linking monomers of the aforesaid type are described in U.S. Pat. No. 2,798,053. Other polyunsaturated compounds that can be employed to prepare the copolymers are the polymeric, benzene soluble products resulting from Na or K catalyzed polymerization of diolefins, preferably conjugated dienes. These polymers have a very large proportion of 1,2 structure in the chain and consequently have a plurality of $CH_2 =$ side groups which can be copolymerized with the acrylic acids. Acrylic acid interpolymers of this type are described in U.S. Pat. No. 2,858,281. Other cross-linking agents that can be copolymerized with acrylic or methacrylic acid are polyallyl or polymethallyl trimethylene trisulfones. These monomers are described in U.S. Pat. Nos. 2,535,533 and 2,535,534 and the acrylic acid copolymers are described in U.S. Pat. No. 2,958,679. Still other cross-linking agents for the acrylic acid polymers are the polyvinyl, polyallyl or polymethylallyl silanes of the corresponding tin compounds. In these compounds the silicon or tin atom is connected to a carbon atom by a covalent bond. The silicon or tin compound of course, must have at least two of the unsaturated groups mentioned above. The preferred monomers of this class are tetrallyl or tetravinyl silane or tin. However, satisfactory copolymers can be reduced with tin compounds having two or three of the groups, vinyl, allyl, or methallyl. The remainder of the silicon or tin atom can have any non toxic group and particularly an allyl group. The acrylic acid copolymers made with the polyallyl or polyvinyl silane or tin compounds are described in U.S. Pat. No. 2,985,631. Still another operable acrylic acid polymer is the copolymer of acrylic or methacrylic acid with small amounts of a polyallyl phosphate ester as the cross-linking agent. The allyl phosphates embodied therein conform to the formula:

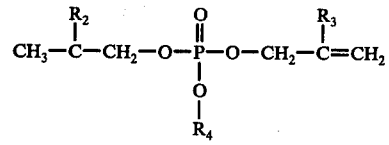

where $R_2$ and $R_3$ are independently selected from the group consisting of a hydrogen atom and a methyl radical, and $R_4$ is selected from the group consisting of a hydrogen atom, an allyl radical, a methallyl radical, an alkyl radical, an arylalkyl radical, an aryl radical and an alkene radical. From this class of monomers, triallyl phosphate is preferred.

Among the more preferred gelling agents of this invention are those sold under the names CARBOPOL 934, CARBOPOL 940 and CARBOPOL 941 which are trademarks of the B.F. Goodrich Chemical Company for materials based essentially on polyacrylic acid. CARBOPOL 934 has an average molecular weight of around 3 million while CARBOPOL 941 has a molecular weight of about 1 million and CARBOPOL 940 has an average molecular weight of about 4 million. These materials in substantially pure form are somewhat acidic due to the plurality of carboxy groups in the chain. The carboxy vinyl polymers which are substantially insoluble in water, can be prepared as described in U.S. Pat. No. 2,798,053 selectively utilizing about 0.75 to 2 percent by weight of polyalkenyl polyether, for example, polyallyl sucrose as a cross-linking material. The remainder of reactants can be essentially acrylic acid or its equivalent. The polymerization can be carried out in a hydrocarbon diluent with a free radical catalyst, for example, benzoyl peroxide. Such polymers are quite suitable materials.

It is presently particularly preferred to employ CARBOPOL 934, a copolymer of acrylic acid and one percent by weight of a polyally ether of sucrose having an average of about 5.8 allyl groups for each sucrose molecule, available commercially from the B.F. Goodrich Company, said material being a high molecular weight carboxy vinyl polymer being specifically described in U.S. Pat. No. 2,909,462 and being formally known as Good-rite K-934.

Another suitable material is CARBOPOL 941, a copolymer of acrylic acid and 0.5 percent by weight of the polyallyl ether of pentaerythritol, sold by the B.F. Goodrich Chemical Company, Cleveland, Ohio.

One description of a preferred class of such carboxy vinyl polymers which can be employed include acrylic acid polymers selected from the group consisting of essentially linear polymers of an alpha, beta-monoolefinically terminally unsaturated monocarboxylic acid having from 3 to 4 carbon atoms and having an average molecular weight between about 5,000 and about 500,000, the cross-linked interpolymer of said monocarboxylic acids and from about 0.25 to about 2.5 percent by weight of a polyunsaturated compound having at least 2 alkenyl groups and copolymerizable with said acid, the interpolymer having an average molecular weight greater than about 200,000, and the aforesaid polymers and interpolymers containing up to 20 mole percent of copolymerized alkyl ester of said monocarboxylic acid wherein the alkyl group of said ester has 1 to 8 carbon atoms.

The neutralizing agent for the carboxy vinyl polymer can be any material known for forming a gel of a dispersion of the carboxy vinyl polymer in the hydrocarbon oil carrier when co-acting with the miscible polar solvent. In like manner the miscible polar solvent can be any material known to co-act with the neutralizing agent to form such a thickening gel. Information on this is found in Carbopol Resin Bulletin GC-37 and Service Bulletin GC-36 of the B.F. Goodrich Chemical Company, 6100 Oak Tree Boulevard, Cleveland, Ohio, 44131, a division of B.F. Goodrich. Some commercially available examples of suitable polar solvents include the lower alcohols such as methanol, ethanol, and isopropanol, which are widely available as items of commerce. Some commercially available examples of suitable neutralizing agents include the longer chain amines such as lauryl amine, stearyl amine, and the like, which are available as items of commerce. For example lauryl amine is available from the Armak Chemicals Division, Box 1805, Chicago, Ill. 60690, as ARMEED CD product.

The materials of the invention can be mixed in a number of desired sequences so long as the oil, carboxy vinyl polymer, resin and neutralizing agent, polar solvent, resin components such as catalysts, coupling agents and the like, and solid particulate material are blended into a relatively homogeneous mass prior to injection. It is preferable to disperse the carboxy polymer in the oil before adding the neutralizing agent and polar solvent to activate its thickening effect.

In the use of the composition of the present invention, a gelled oil mixture comprising a hydrocarbon oil, carboxy vinyl polymer, polar solvent, and neutralizing agent is prepared to have a viscosity substantially the same as the viscosity of the gelled oil portion of the composition comprising the hydrocarbon oil, carboxy vinyl polymer, polar solvent, neutralizing agent solid particulate matter and polymer resins. The gelled oil mixture so prepared is injected immediately ahead of the composition containing the carboxy vinyl polymer, hydrocarbon oil, polar solvent, neutralizing agent, particulate matter and polymer resin so that the composition is maintained at substantially a constant viscosity during injection. In other words, contact with a leading fluid, such as water, oil, or the like, tends to result in mixing of the composition with the leading fluid thereby resulting in difficulties in maintaining the resin and particulate matter in suspension. Such problems are obviated by the use of the leading mixture containing hydrocarbon oil, carboxy vinyl polymer, polar solvent, and neutralizing agent.

The composition of the present invention is then injected, and a trailing slug comprising a gelled oil mixture of hydrocarbon oil, carboxy vinyl polymer, polar solvent, and neutralizing agent in substantially the same proportions as used initially is injected. Such is desirable to prevent mixing of the trailing portions of the composition with a trailing fluid and the like.

The trailing gelled oil mixture is commonly followed by a wiper plug which is followed by oil, water, or the like. The fluid trailing the wiper plug is used to force liquid components of the composition into the formation, thereby resulting in positioning the polymer and the like about the wellbore to form a consolidated sheath in the zone of interest contacting the formation. In the practice of the present invention, water, oil, or the like can be injected behind the wiper plug to force a composition into the formation until such time as the polymer and sand have entered the formation about the wellbore. The entry of the composition into the formation about the wellbore is indicated by a sudden increase in the pumping pressure necessary to pump fluid into the wellbore behind the wiper plug. Upon observing the pressure increase, pumping is stopped for a sufficient period of time to allow the resin to polymerize.

Optionally, a bit, scraper, or the like is then passed down the wellbore to remove the excess polymer and particulate matter from inside of the wellbore, and thereafter the well is ready for a return to production or the like.

Following are examples provided in order to more fully explain the present invention and to provide information sufficient for those skilled in the art to carry it out. However, it is to be understood that these examples are not intended to function as limitations on the invention as described and claimed herein.

EXAMPLE 1

A sample of gelled diesel oil wherein the gelling agent was CARBOPOL 934 carboxy vinyl polymer was prepared. Two percent CARBOPOL 934 carboxy vinyl polymer (a copolymer of acrylic acid and one percent by weight of polyallyl ether of sucrose having an average of about 5.8 allyl groups per each sucrose molecule available from the B.F. Goodrich Chemical Company, Cleveland, Ohio) gelled diesel fuel was prepared by adding 12 grams of ARMEED CD lauryl amine (neutralizing agent) to 200 grams of No. 1 diesel fuel, stirring until the lauryl amine was dissolved, and then adding 4 grams of CARBOPOL 934 carboxy vinyl polymer and stirring until the polymer was thoroughly dispersed. A total of 24 grams of ethanol (polar solvent) was added and the mixture was stirred at a high shear rate to obtain a high viscosity gelled diesel oil.

This example demonstrates that a carboxy vinyl polymer activated by a neutralizing agent and a polar solvent is effective as a gelling agent for diesel fuel in a base-containing formulation and that the thus gelled material is suitable in a sand-resin slurry resin system for emplacing basic catalyzed resins in contact with incompetent formations.

EXAMPLE 2

A slurry was prepared by admixing 125 ml of the gelled diesel fuel produced in Example 1 and 300 grams of 40–60 mesh sand to which was added 25 ml of EPON 838 epoxy resin (a liquid aromatic polyepoxide comprising a reaction product of bisphenol in epichlorohydrin available from Shell Chemical Company, New Orleans, La.) (a base-settable liquid thermosetting resin) 2.5 ml of diethylenetriamine (DETA) (catalyst), and 0.2 ml of SILANE A-1100 (gamma-aminopropyltriethoxysilane) (coupling agent). The mixture produced thereby was a stable, pumpable slurry capable of being injected into a wellbore by conventional means, to contact a subterranean incompetent formation wherein the resin coats the sand, thereafter hardening and consolidating the sand to form a sand control filter.

This example in combination with Example 1 demonstrates that a carboxy vinyl polymer represented by CARBOPOL 934 polymer is effective as a gelling agent for diesel fuel in a sand-resin slurry system with a base catalyzed liquid resin when employed according to this invention.

CONTROL EXAMPLE 3

A similar slurry was prepared with the same ingredients except that a phenolic-furfuryl alcohol resin and an acid catalyst were substituted for the epoxy resin and the DETA. The resin was 25 ml of a solution of 33 percent DUREZ 7421 A phenolic resin (a single component hydroxy aryl aldehyde resin prepared by reacting together at 60° to 70° C, 500 grams of phenol, 40 grams of 37 percent aqueous solution of formaldehyde and 25 grams of sodium hydroxide dissolved in 25 grams of water until the formaldehyde was fully combined, and to this mixture adding 50 grams of recorcinol and 50 grams of 37 percent aqueous solution of formaldehyde, wherein the resulting mixture was refluxed and dehydrated under vacuum to a viscosity of 3200 cps, the resulting resin being mixed with furfuryl alcohol in a ratio of 1:2 parts per volume to form the resin; the resin being a product of the DUREZ division of Hooker Chemical Company) in furfuryl alcohol, and the catalyst was a 50 percent aqueous solution of hypophosphorous acid. When the resin and acid were added to the slurry, the formerly gelled diesel oil would no longer suspend the sand, rendering the slurry unpumpable. The resulting mixture was cured overnight at 160° F, and the resulting resin cured sand had no measurable strength.

This control example demonstrates that diesel fuel gelled with CARBOPOL 934 carboxy vinyl polymer is not effective with acid catalyzed resin such as phenolic-novolac, furan or furfuryl resins and consequently is not a general purpose thickening agent suitable for any hydrocarbon carried formulation.

EXAMPLE 4

Slurries similar to that prepared in Examples 1 and 2 were prepared using diesel fuel gelled with varying concentrations of CARBOPOL 934 carboxy vinyl polymer, e.g., 0.5 percent, 1 percent and 2 percent. All other ingredients were the same. A control slurry was also prepared for comparison using Pale Oil 400 (a refined viscous oil used in prior art systems which is a refined paraffinic mineral oil having an API gravity of 30.0, a C-H ratio of 6.3, a molecular weight of 482, a SUS viscosity of 100° F of 399.3, at 210° F of 57.61, a pour point of 0° F, and an ASTM color of 2) with all other ingredients being the same. Samples of each of the four slurries prepared were poured into ⅜ inch diameter by six inch long Tygon vinyl plastic tubes, placed in a water bath and cured overnight at 160° F. Each sample was then removed from the vinyl tubing, cut into ⅜ inch long cylindrical sections and tested for compressive strength with the following results:

| Viscous Oil | Average Compressive Strength PSI |
|---|---|
| Pale Oil 400 | 1,954 |
| 0.5% Carbopol polymer in Diesel Oil | 2,669 |
| 1.0% Carbopol polymer in Diesel Oil | 2,260 |
| 2.0% Carbopol polymer in Diesel Oil | 1,475 |

These data demonstrate that diesel fuel gelled with 0.5 percent and 1 percent CARBOPOL 934 carboxy vinyl polymer and used to slurry sand and epoxy resin yield higher strength consolidated cores than a conventional system using naturally viscous oil such as the pale oil.

EXAMPLE 5

Runs were made in a similar manner by adding 1 percent, 5 percent, and 10 percent of a 50 percent aqueous solution of hypophosphorous acid directly to the CARBOPOL 934 carboxy vinyl polymer gelled diesel fuel such as prepared in Example 1. In each case the acid destroyed the gel structure. Similar runs adding the 7421A resin in furfuryl alcohol to the CARBOPOL 934 carboxy vinyl polymer gelled diesel fuel also demonstrated that the gel structure was destroyed immediately as the resin was added. These control runs demonstrate that acid can be used to break the gel structure of CARBOPOL 934 carboxy vinyl polymer gelled diesel fuel once the slurry is in place in the well, which demonstrates a method for rapid clean-up when the well is put on production. These data further demonstrate the unsuitability of the carboxy vinyl polymers for thickening acid containing systems.

CONTROL EXAMPLE 6

Other oil gelling agents have been tested for the purpose of suspending sand and resins for treating wells to control formation sand, but have been found to be incompatible with the resins and systems.

In one example, sodium palmitate and sodium hydroxide were employed to gel the diesel oil. A slurry was prepared with 125 ml of the gelled diesel oil, 300 g of 40–60 mesh sand, 50 ml of Dowell's K70–K71 resin, 3 ml of 25 percent aqueous sodium hydroxide and 0.2 ml of the Silane A1100 coupling agent. The K70–K71 resin was added last to the slurry, and as it was added, the gel broke, rendering the slurry unpumpable.

Such a series of runs indicate that conventional oil gelling agents cannot be used in conjunction with resins, catalysts or coupling agents required to make a slurry that can be easily pumped into a well and placed in contact with a subterranean formation where, with time and temperature conditions normally encountered, the resin will harden forming a permeable consolidated sand filter that will stop formation sand movement and allow formation fluids to be produced.

The compositions of the present invention are effective in providing a means of accomplishing these ends when used as described according to the application.

EXAMPLE 7

A total of 460 gallons of diesel fuel, 64.4 pounds of CARBOPOL 934 carboxyl vinyl polymer, 257.6 pounds of ethanol, and 193.2 pounds of ARMEED CD lauryl amine are mixed to form a gelled mixture. 250 gallons of the gelled diesel fuel is left in the mixer and the remaining 210 gallons is placed in a storage tank. 3750 pounds of 40–60 U.S. mesh sand is mixed with the 250 gallons of the gelled mixture, and 312 pounds of EPON 828 epoxy resin, 31 pounds of DETA, and 0.06 gallons of gamma-aminopropyltriethoxy silane then mixed in to form an injection mixture.

After the injection mixture is mixed for 10 minutes, 126 gallons of gelled oil from the storage tank is pumped into a well into the zone of an incompetent formation, followed by the injection mixture, and this is followed by the remaining 84 gallons of gelled oil from the storage tank.

The gelled oil is displaced by a wiper plug and followed by ungelled diesel fuel. Additional diesel fuel (oil) is injected to displace the injection mixture into the formation and pack the sand tightly against the formation (as indicated by a sudden increase in the pressure required to inject the diesel fuel). Pumping is then stopped and the resin is allowed to harden. A bit and scraper are then employed to remove excess plastic and sand from the inside of the wellbore.

We claim:

1. A composition for positioning a base-settable polymeric material having particulate matter disposed therein in contact with a subterranean formation penetrated by a wellbore, the composition consisting essentially of:
   (a) a substantially neutral hydrocarbon oil;
   (b) a carboxy vinyl polymer selected from the group consisting of: an essentially linear polymer of an alpha, beta-monoolefinically, terminally unsaturated carboxylic acid having 3 to 4 carbon atoms and having an average molecular weight of about 5000 to about 500,000; a cross-linked interpolymer of said monocarboxylic acid and about 0.25 to 2.5 percent by weight of a polyunsaturated compound having at least two alkenyl groups and copolymerizable therewith, the interpolymer having an average molecular weight greater than about 200,000; and the aforesaid polymer and interpolymer containing up to 20 mole percent of copolymerized alkyl ester of the monocarboxylic acid wherein the alkyl group of the ester has 1 to 8 carbom atoms, the carboxy vinyl polymer being present in the composition in an amount sufficient to produce an apparent viscosity in the composition of at least 50 cps, but less than 5000 cps at the injection temperature and pressure and an apparent minimum viscosity at bottom hole conditions of at least 25 cps;
   (c) a neutralizing agent for the carboxy vinyl polymer;
   (d) a miscible polar solvent for the carboxy vinyl polymer;
   (e) finely-divided solid particulate material in an amount equal to about 0.25 to about 22 parts of particulate matter per gallon of the oil; and
   (f) a base-settable liquid thermosetting resin in an amount equal to about 0.1 to about 5.0 gallons per cubic foot of the particulate material.

2. The composition of claim 1 wherein the carboxy vinyl polymer is a cross-linked interpolymer of acrylic acid and a polyallyl ether of sucrose having an average molecular weight greater than about 200,000.

3. The composition of claim 1 wherein the carboxy vinyl polymer is a cross-linked interpolymer of acrylic acid and polyallyl ether of pentaerythritol having an average molecular weight greater than about 200,000.

4. The composition of claim 1 wherein the carboxy vinyl polymer is CARBOPOL 934, a copolymer of acrylic acid and about 1 percent by weight of a polyallyl ether of sucrose having an average of about 5.8 allyl groups for each sucrose molecule; wherein the neutralizing agent is lauryl amine; and wherein the polar solvent is ethanol.

5. The composition of claim 1 wherein the carboxy vinyl polymer is CARBOPOL 941, a copolymer of acrylic acid and about 0.5 percent by weight of the polyallyl ether of pentaerythritol; wherein the neutralizing agent is lauryl amine; and wherein the polar solvent is ethanol.

6. The composition of claim 1 wherein the resin is present in an amount equal to about 1.0 to about 2.0 gallons of resin per cubic foot of particulate material.

7. A composition for positioning a base-settable polymeric material having particulate matter disposed therein in contact with a subterranean formation penetrated by a wellbore, the composition consisting essentially of:
   (a) a substantially neutral hydrocarbon oil;
   (b) a carboxy vinyl polymer selected from the group consisting of: an essentially linear polymer of an alpha, beta-monoolefinically, terminally unsaturated carboxylic acid having 3 to 4 carbon atoms and having an average molecular weight of about 5000 to about 500,000; a cross-linked interpolymer of said monocarboxylic acid and about 0.25 to 2.5 percent by weight of a polyunsaturated compound having at least two alkenyl groups and copolymerizable therewith, the interpolymer having an average molecular weight greater than about 200,000; and the aforesaid polymer and interpolymer containing up to 20 mole percent of copolymerized alkyl ester of the monocarboxylic acid wherein the alkyl group of the ester has 1 to 8 carbon atoms, the carboxy vinyl polymer being present in the composition in an amount sufficient to produce an apparent viscosity in the composition of at least 50 cps, but less than 5000 cps at the injection temperature and pressure and an apparent minimum viscosity at bottom hole conditions of at least 25 cps;
   (c) a neutralizing agent for the carboxy vinyl polymer;
   (d) a miscible polar solvent for the carboxy vinyl polymer;
   (e) finely-divided solid particulate material in an amount equal to about 0.25 to about 22 parts of particulate matter per gallon of the oil;
   (f) a base-settable liquid thermosetting resin in an amount equal to about 0.1 to about 5.0 gallons per cubic foot of the particular material; and
   (g) an effective amount of a coupling agent.

8. The composition of claim 7 wherein the coupling agent is glycidoxypropylthimethoxy silane or N-aminoethylaminopropyltriethoxy silane; the base-settable liquid thermosetting resin is a liquid aromatic polyepoxide; the neutralizing agent is an amine, the polar solvent is an alcohol; the neutral hydrocarbon oil is diesel fuel; and wherein the solid particulate material is 40–60 mesh sand.

9. The composition of claim 8 wherein the coupling agent is gamma-aminopropyltriethoxy silane; wherein the carboxy vinyl polymer is CARBOPOL 934, a copolymer of acrylic acid and about 1 percent by weight of a polyallyl ether of sucrose having an average of about 5.8 allyl groups for each sucrose molecule; wherein the amine is lauryl amine; and wherein the alcohol is ethanol.

* * * * *